United States Patent [19]

Chen

[11] Patent Number: 4,803,670
[45] Date of Patent: Feb. 7, 1989

[54] ULTRASONIC RANGING DEVICE

[75] Inventor: Ming-Hui Chen, Taipei, Taiwan

[73] Assignee: Li-Ling Lin, Taipei, Taiwan

[21] Appl. No.: 70,564

[22] Filed: Jul. 7, 1987

[51] Int. Cl.⁴ .................... G01S 15/93; G08G 1/16
[52] U.S. Cl. ................................ 367/99; 367/909; 340/904
[58] Field of Search ............... 367/99, 107, 118, 91, 367/96, 909, 910, 104, 140; 340/904

[56] References Cited

U.S. PATENT DOCUMENTS 4,278,962  7/1981  Lin ...................................... 367/909
4,654,834  3/1987  Dorr .................................... 367/909

Primary Examiner—Thomas H. Tarcza
Assistant Examiner—Ian J. Lobo
Attorney, Agent, or Firm—Lackenbach Siegel Marzullo & Aronson

[57] ABSTRACT

An improved ultrasonic ranging device having a ultrasonic sensor unit provided for detecting the distance between a ground object and a rear end of a vehicle includes: a casing body composed of a front casing and a rear casing with a round opening formed in the opposing ends; a control unit with a plurality of microswitches and a control circuit installed at one end of the casing body and electrically connected to the ultrasonic sensor unit; a gear system with a motor and a reduction gear member disposed at another end of the casing body and electrically connected to the control circuit; and a protective cover with a transmission arrangement movably connected to the casing body with the transmission arrangement meshed with the reduction gear and the control unit; thereby, the protective cover can be automatically raised up and lowered down along with the backward and forward movements of a vehicle for protecting the ultrasonic ranging device against water, dust and mud.

1 Claim, 3 Drawing Sheets

ULTRASONIC RANGING DEVICE

BACKGROUND OF THE INVENTION

This invention relates to an ultrasonic ranging device, and more particularly to an improved ultrasonic ranging device having a casing body and a control means specifically designed for being automatically operated to protect the ranging device against water, dust and mud so as to promote the ranging efficiency and prolong the life expectancy of the ranging device.

It is known that some vehicles are equipped with an ultrasonic ranging device attached at a rear side of the vehicle trunk for being used to detect the distance between the rear bumper of the vehicle and an object therebehind when the vehicle is geared to reverse so as to prevent the vehicle from bumping against the object. However, because the known ultrasonic ranging devices installed on the back end of vehicles are constantly exposed to the elements, the outer surface thereof soon becomes covered with foreign materials such as dust, mud, etc. Consequently, not only is the detecting function of the ranging device affected, the life expectancy is also shortened.

SUMMARY OF THE INVENTION

It is accordingly a primary object of this invention to provide an improved ultrasonic ranging device with a specifically designed casing body that overcomes the foregoing problems associated with the prior art.

This and other objects are achieved by providing an improved ultrasonic ranging device with a specifically designed casing body which is combined of a front casing with an ultrasonic sensor unit installed therein, a rear casing connected to the front casing with a round opening formed in each end thereof, and a protective cover having a transmission means provided therein movably coupled to the casing body. A control means having a plurality of microswitches and a control circuit provided therein is disposed in the casing body and electrically connected to the sensor unit. A gear system with a motor and reduction gear arrangement is installed in one side of the casing body for being driven to rotate in both directions, and a protective cover is movably disposed over the casing body in conjunction with the reduction gear arrangement of the gear system and with the microswitches of the control unit so that, the protective cover will be raised up for enabling the sensor unit to perform distance detection when the vehicle is in reverse movement and automatically lowered down to shield the ranging device from dust and mud when the vehicle is in forward movement. In addition, an auxiliary illuminating light is disposed on the front of the casing for illuminating the rear path when the vehicle is in reverse movement during the time the protective cover is raised.

Other advantages and characteristics of the invention will become clear from the following detailed description of a preferred embodiment when read in conjunction with the accompanying drawings.

DETAILED DESCRIPTION OF THE PREFERRED EMBODIMENT

Figure 1:
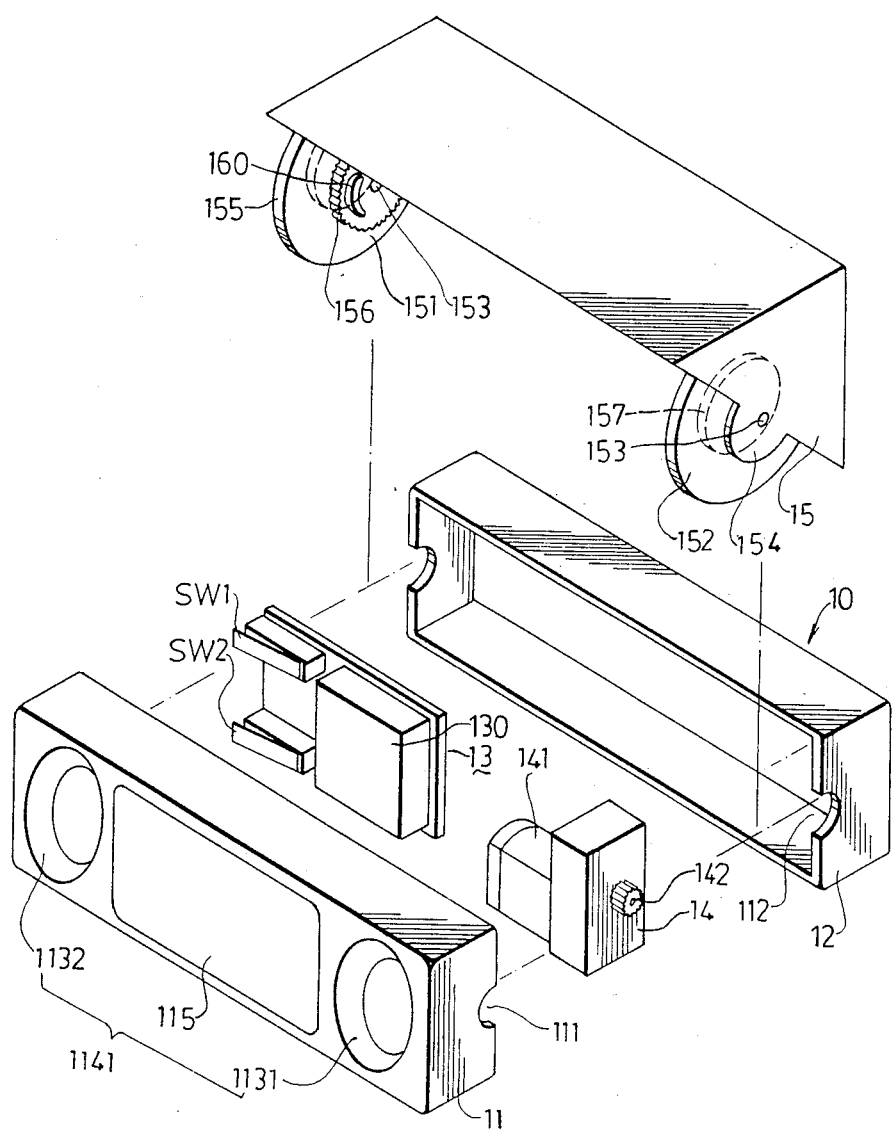
FIG. 1 is an exploded and perspective view of the preferred embodiment of an improved ultrasonic ranging device according to this invention.

Referring to FIG. 1, the preferred embodiment of an improved ultrasonic ranging device according to this invention includes in combination: a casing body 10, which is composed of a front casing 11 and a rear casing 12; a control unit 13, together with a gear system 14, separately installed in the casing body 10; and a protective cover 15 movably disposed over the casing body 10 in connection with the control unit 13 and the gear system 14.

As shown in FIG. 1, the front casing 11 and the rear casing 12 each includes a semi-circle opening 111, 112 provided at each end side thereof for being combined to form a round opening (not shown) in the opposite ends of the casing body 10. The front casing 11 includes an auxiliary illuminating light 115 provided on a front surface, an ultrasonic sensor unit 1141 composed of a transmitter 1131 and a receiver 1132 installed therein for detecting the distance between a ground object and the rear end of a vehicle. Since the ultrasonic sensor unit 1141 is well known to those skilled in the art, a detailed description thereof is omitted for brevity. The gear system 14 having a motor 141 provided therein and a reduction gear 142 rotatably connected to the motor shaft of the motor 141 is installed in the casing body 10 with the free end of the reduction gear 142 located below the round opening formed by the semi-circle openings 111 and 112 of the casing body 10.

Figure 2:
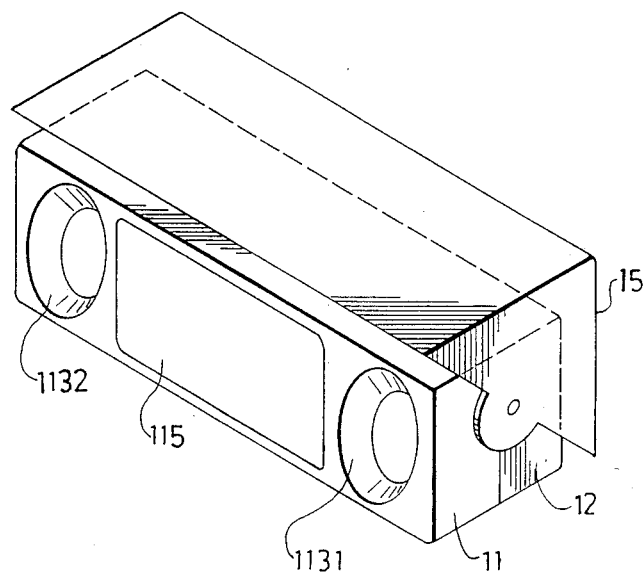
FIG. 2 is an illustrative view of the preferred embodiment shown in an assembled condition.
Figure 3:
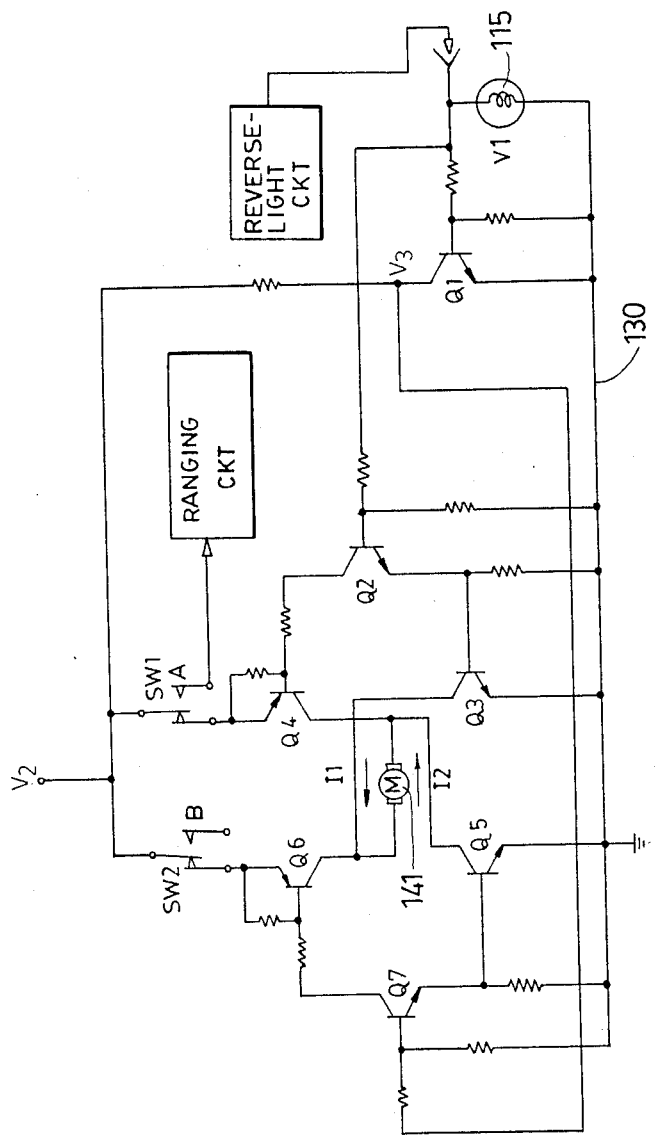
FIG. 3 is a circuit diagram of a control means disposed in the preferred embodiment of FIG. 1.

Referring to FIGS. 1, 2 and 3, the control unit 13 having a pair of microswitches SW1 and SW2 and a control circuit 130 provided therein is installed in the casing body 10 wherein the contact A of SW1 is electrically connected to the ranging circuit 18, which is functionally associated with the ultrasonic sensor unit 1141 for detecting the distance between a ground object and the rear end of a vehicle. Since the arrangement of the ultrasonic sensor unit 1141 and the ranging circuit 18 is a known art, detailed description is omitted. The control circuit 130 according to this invention is composed of a plurality of transistors Q1 to Q7 of which transistor Q1 is electrically connected to the auxiliary illuminating light 115 being associated with the vehicle reverse-light circuit 17 (which is also a known art), the circuit arrangement of transistors Q2, Q3, Q4 is coupled with the motor 141 of the control unit 14 and the microswitch SW1 for controlling the positive rotation of the motor 141, and the circuit arrangement of transistors Q5, Q6, Q7 is coupled with the microswitch SW2 of the control unit 13 and the motor 141 of the gear system 14 for controlling the reverse rotation of the motor 141.

The protective cover 15 formed in an open triangular shape includes: a pair of annular side lugs 154 and 155 integrally provided at each end; and a transmission means composed of a pair of wheels 151 and 152 each having a toothed disk 156, 157 (disk 157 cannot be seen in the drawing) formed in the center and separately connected to the annular side lugs 154 and 155 through a supporting axle 153 wherein a sector rail 160 is provided on the toothed disk 156. As shown in FIGS. 1 and 2, after the protective cover 15 is movably connected to the casing body 10, both the toothed disks 156 and 157 are located in the casing body 10 through a round opening formed by the semi-circle openings 111 and 112, and the toothed disk 157 is meshed with the reduction gear 142, and the sector rail 160 of the toothed disk 156 is located between the microswitches SW1 and SW2 so as to effect the raising up and lowering down of the protective cover 15 along with the positive and reverse rotations of the motor 141 of the control unit 14.

Figure 4:
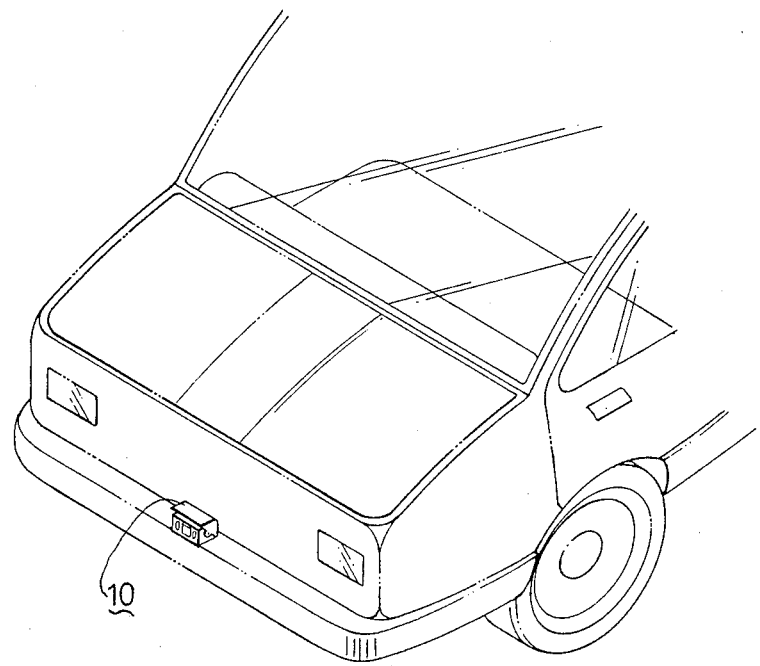
FIG. 4 is an illustrative view of the preferred embodiment shown in FIG. 2 installed on a rear side of a vehicle trunk.

As shown in FIG. 4, the assembled casing body 10 of the preferred embodiment can be installed on a rear bumper behind the vehicle trunk. Operations of the preferred embodiment are as follows:

Referring to FIGS. 1 and 3, when the reverse gear of a vehicle having the improved ultrasonic ranging device installed thereon is set to move the vehicle backward, the positive voltage VI will flow through the auxiliary illuminating light 115 to illuminate the path behind the vehicle and cause the transistors Q1 and Q2 to conduct. As a result, transistors Q3 and Q4 are turned on with current I1 flowing leftward across the motor 141 which is actuated to start positive rotation with the reduction gear 142. Thus, the toothed disk 157 meshed with the reduction gear 142 will rotate forward, thereby raising the protective cover 15. In the meantime, the sector rail 160 on the toothed disk 156 will also rotate forward along with the toothed disk 157 and press the microswitch SW1 to contact point A, as shown in FIG. 3, so that the motor 141 stops rotating, and the positive voltage V2 is then impressed across the ranging circuit 18 to start its ranging function with the sensor unit 1141. When the vehicle is shifted from reverse to drive, the voltage V1 stops flowing into the control unit 13, and the transistor Q1 is cut off. At this time the point V3 at the collector of Q1 becomes a high potential level, causing the transistors Q7, Q5, A7 to successively conduct thereat, and the current I2 flows rightward across the motor 141, which is therefore actuated to start a reverse rotation along with the reduction gear 142 and the toothed disks 156 and 157 so that the protective cover 15 is lowered down therefrom, and the sensor unit 1141 is covered accordingly. In the meantime, when the toothed disk 156 is being moved backward along with the protective cover 15, the sector rail 160 will press the microswitch SW2 to contact point B, thereby stopping the motor.

While a preferred embodiment has been illustrated and described, it is apparent that many changes may be made in the general construction and arrangement of the invention without departing from the spirit and scope thereof, and it is therefore desired that the invention not be limited to the exact disclosure but only to the extent of the appended claims.

What is claimed is:

1. In an improved ultrasonic ranging device having an ultrasonic sensor unit with a protective cover fixedly provided therein for detecting the distance between a ground object and the rear end of a vehicle during reverse movement, a control circuit electrically connected to the ultrasonic sensor unit for effecting electrical control operations, and a motor mechanism connected to the control circuit for providing forward and reverse rotations, the improvement which comprises:
  a body structure composed of a front casing and a rear casing with a round opening formed in each end thereof and an auxiliary illuminating light provided on one side of the front casing and electrically connected to the control circuit for illuminating the rear path and providing a warning signal when the reverse gear of a vehicle is set to make a backward movement;
  a plurality of switches respectively coupled with the ultrasonic sensor unit and the control circuit for being automatically operated to effect distance detecting and rotation control operations; and
  transmission means furnished at each end of said body structure and rotatably coupled with the motor mechanism as well as movably kept in contact with said switches for being driven to open and close said body structure as well as to turn on and off said switches in performing detecting operations; whereby, distance detecting operations can be effectively started and stopped along with the backward and forward movements of the vehicle;
  said transmission means comprising a triangular shaped cover having a pair of annular side lugs integrally formed at each end for being movably connected to said body structure at each end thereof through said round openings; a pair of wheels each having a gear disk provided in a center area thereof and separately fixed within each end of said triangular shaped cover through an axle with one gear disk of said gear disks at one side being rotatably engaged with a reduction gear of the motor mechanisms, and another gear disk at another side being provided with a sector rail on a top surface for being rotated to make contact with respective switches in connection with a positive rotation and a reverse rotation of the motor mechanism; so that when the reverse gear is set to move the vehicle backward, said transmission means will drive said triangular shaped cover to raise up from said body structure for range detection operation, while, as the gear is shifted to move the vehicle forward, said transmission means will drive said triangular shaped cover to lower down from said body structure for protecting the ultrasonic sensor unit from water, dust and mud.

* * * * *